(12) United States Patent
Anderson et al.

(10) Patent No.: US 10,248,813 B2
(45) Date of Patent: Apr. 2, 2019

(54) ORGANIZING KEY-VALUE INFORMATION SETS INTO HIERARCHICAL REPRESENTATIONS FOR EFFICIENT SIGNATURE COMPUTATION GIVEN CHANGE INFORMATION

(71) Applicant: International Business Machines Corporation, Armonk, NY (US)

(72) Inventors: Sheehan Anderson, Durham, NC (US); Manish Sethi, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 14/985,495

(22) Filed: Dec. 31, 2015

(65) Prior Publication Data
US 2017/0161522 A1    Jun. 8, 2017

(30) Foreign Application Priority Data

Dec. 2, 2015    (IN) .......................... 6475/CHE/2015

(51) Int. Cl.
G06F 21/64    (2013.01)
G06F 17/30    (2006.01)
H04L 9/32    (2006.01)

(52) U.S. Cl.
CPC ........ *G06F 21/64* (2013.01); *G06F 17/30327* (2013.01); *H04L 9/3242* (2013.01)

(58) Field of Classification Search
CPC ... G06F 21/64; G06F 17/30327; H04L 9/3242

USPC .................................. 726/26; 713/150–190
See application file for complete search history.

(56) References Cited

U.S. PATENT DOCUMENTS 8,374,353 B2 * 2/2013 Kim .................... H04L 9/0836
380/273
2005/0044356 A1 * 2/2005 Srivastava ............ H04L 9/0827
713/163

OTHER PUBLICATIONS

Github, "Patricia Tree", 4 pages, Copy available at: https://github.com/ethereum/wiki/wiki/Patricia-Tree, Accessed on Dec. 3, 2015.

* cited by examiner

*Primary Examiner* — Mohammed Waliullah
(74) *Attorney, Agent, or Firm* — Ference & Associates LLC (57) ABSTRACT

One embodiment provides a method for enabling computation of a signature of an information set given change information by storing information in a hierarchical data structure, the method including: utilizing at least one processor to execute computer code that performs the steps of: receiving change information relating to a first node within the hierarchical data structure; accessing a database comprising at least one key, wherein the at least one key comprises a crypto-hash and is assigned to a node within the hierarchical data structure; identifying a node key within the database that is assigned to the first node; computing a node crypto-hash for the first node after modifying the first node using the received change information; modifying the node key based upon the computed node crypto-hash; and updating the database with the modified node key. Other aspects are described and claimed.

20 Claims, 3 Drawing Sheets

ORGANIZING KEY-VALUE INFORMATION SETS INTO HIERARCHICAL REPRESENTATIONS FOR EFFICIENT SIGNATURE COMPUTATION GIVEN CHANGE INFORMATION

BACKGROUND

Entities (e.g., companies, individuals, systems, etc.) may store large amounts of information. In some cases, entities may have data sources which are interconnected between other entities. For example, one company may have a database that is shared with another company. In some cases, the shared database may include a shared and replicated database which means that the database is not a single database but rather a database that is replicated and shared between the entities connected on a network.

To ensure that the data match across all replicated instances, the fingerprint or signature of the information within the database needs to be computed. One method of computing a fingerprint or signature is to compute a crypto-hash associated with the information. For efficient computation of the fingerprint or signature, the information within the database is typically organized in a hierarchical data structure. One type of hierarchical data structure is a Merkle tree. In a hierarchical data structure, information is organized within nodes. When a single node changes, the fingerprint for this node is recomputed. Additionally, because the fingerprint of one node changed, the fingerprint of other nodes, including the root node, need to be recomputed.

BRIEF SUMMARY

In summary, one aspect of the invention provides a method for enabling computation of a signature of an information set given change information by storing information in a hierarchical data structure, the method comprising: utilizing at least one processor to execute computer code that performs the steps of: receiving change information relating to a first node within the hierarchical data structure; accessing a database comprising at least one key, wherein the at least one key comprises a crypto-hash and is assigned to a node within the hierarchical data structure; identifying a node key within the database that is assigned to the first node; computing a node crypto-hash for the first node after the first node is modified using the received change information; modifying the node key based upon the computed node crypto-hash; and updating the database with the modified node key.

Another aspect of the invention provides an apparatus for enabling computation of a signature of an information set given change information by storing information in a hierarchical data structure, the apparatus comprising: at least one processor; and a computer readable storage medium having computer readable program code embodied therewith and executable by the at least one processor, the computer readable program code comprising: computer readable program code that receives change information relating to a first node within the hierarchical data structure; computer readable program code that accesses a database comprising at least one key, wherein the at least one key comprises a crypto-hash and is assigned to a node within the hierarchical data structure; computer readable program code that identifies a node key within the database that is assigned to the first node; computer readable program code that computes a node crypto-hash for the first node after the first node is modified using the received change information; computer readable program code that modifies the node key based upon the computed node crypto-hash; and computer readable program code that updates the database with the modified node key.

An additional aspect of the invention provides a computer program product for enabling computation of a signature of an information set given change information by storing information in a hierarchical data structure, the computer program product comprising: a computer readable storage medium having computer readable program code embodied therewith, the computer readable program code comprising: computer readable program code that receives change information relating to a first node within the hierarchical data structure; computer readable program code that accesses a database comprising at least one key, wherein the at least one key comprises a crypto-hash and is assigned to a node within the hierarchical data structure; computer readable program code that identifies a node key within the database that is assigned to the first node; computer readable program code that computes a node crypto-hash for the first node after the first node is modified using the received change information; computer readable program code that modifies the node key based upon the computed node crypto-hash; and computer readable program code that updates the database with the modified node key.

A further aspect of the invention provides a method for enabling computation of a signature of an information set given change information by storing information in a hierarchical data structure, the method comprising: utilizing at least one processor to execute computer code that performs the steps of: receiving change information relating to a first node within the hierarchical data structure, wherein the change information comprises key identification information of the first node; updating the first node using the received change information; accessing a database comprising at least one key, wherein the at least one key comprises a crypto-hash and is assigned to a node within the hierarchical data structure; identifying a node key within the database that is assigned to the first node, wherein the identifying comprises matching the key identification information contained within the change information to the node key; the node key comprising a crypto-hash for the first node; computing a node crypto-hash for the first node after the first node is modified using the received change information; modifying the node key based upon the computed node crypto-hash, wherein the modifying comprises updating the crypto-hash for the first node comprised within the node key with the computed node crypto-hash; identifying a parent key within the database assigned to a parent node of the first node, wherein the parent key comprises a crypto-hash for the parent node; the first node being dependent on the parent node within the hierarchical structure; computing a parent crypto-hash for the parent node, wherein the computing comprises using the modified node key to compute the parent crypto-hash; modifying the parent key based upon the computed parent crypto-hash, wherein the modifying the parent key comprises updating the crypto-hash for the parent node comprised within the parent node key with the computed parent crypto-hash; and updating the database with the modified node key and the modified parent key.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

For ease in computing a fingerprint or signature for an information set, the information is typically stored in a hierarchical data structure containing nodes of information. When information is changed within the hierarchical data structure, a new fingerprint or signature has to be computed for that node. Recomputing the fingerprint of a single node causes other nodes to need a recomputation of their fingerprints. For example, the parent node's and root node's fingerprints need to be recomputed because the fingerprint of a node changed. The root node fingerprint is also considered to be the fingerprint of the entire information set. One benefit to the hierarchical data structure is that not every node within the data structure has to have their fingerprint recalculated. Rather, only a few nodes' fingerprints need to be recomputed because the fingerprints of the nodes are stored with the information set. If no change is made to a particular part of the information set, then the fingerprint associated with that part of the information set does not change and the previously stored fingerprint can be used in any recomputation of fingerprints for nodes that need to be recomputed (e.g., the root node, parent nodes, etc.).

In current solutions for accessing information within a hierarchical data structure based upon change information, the information is accessed in a top-down fashion. In other words, the change information, while associated with a particular node, cannot be directly matched to that node until the key for that node is identified. To identify the key for that node, current solutions require accessing the root node first. The hierarchical data structure is then traversed with each node being matched to a key until the desired node is reached and that key is identified. Therefore, one problem with this approach is that because the system works in a top-down fashion, the system requires additional processing power and time to effectuate the change throughout the data structure. Another problem is that the system has to access the data structure frequently in order to locate the key for a particular node, for example, for every node that has to be traversed to access the key for the desired node, the system has to access the database or key store.

Accordingly, an embodiment provides a method enabling efficient computation of a signature of an information set stored in a hierarchical data structure given change information. An embodiment provides that when a change is received affecting a node within the hierarchical data structure, the change can be processed at the node that is affected and then promulgated throughout the remaining hierarchical data structure. In other words, rather than having to access the root node and the key store for the root node and every other node between the root node and the desired node, an embodiment provides a system that can match the change information to a particular key within the database or key store. In other words, rather than requiring a top-down key store access, an embodiment provides that the change can be started at the desired node and then propagated up through the hierarchical data structure. Upon receiving the change information, an embodiment may identify the key assigned to the node within a database and compute a node crypto-hash for the node based upon modifying the node with the changes. If a key does exist, an embodiment may modify the node based upon the computed node crypto-hash. If a key does not exist, an embodiment may create a key based upon the computed node crypto-hash. Upon modifying or creating the key, an embodiment may then update the database to reflect the changed key value.

Such a system provides a technical improvement over current systems for computing a fingerprint for a node within a hierarchical data structure based upon change information in that the system is more efficient and requires less processing power. As an example, the system does not have to access every node within the system starting at the top to identify the key for a particular node to effectuate a change within the change information. Instead, the system may use the change information to identify a key within the database for the node. Upon identification of the key, the system may then recompute the fingerprint for this node and then recompute the fingerprint of the root node and any intervening nodes. Additionally, in one embodiment, based upon the key values the system does not have to continually access the data store to determine which nodes are dependent on other nodes. Instead, the key value for an affected node can be derived from the key value of the first changed node, thereby reducing the access requests.

Figure 1:
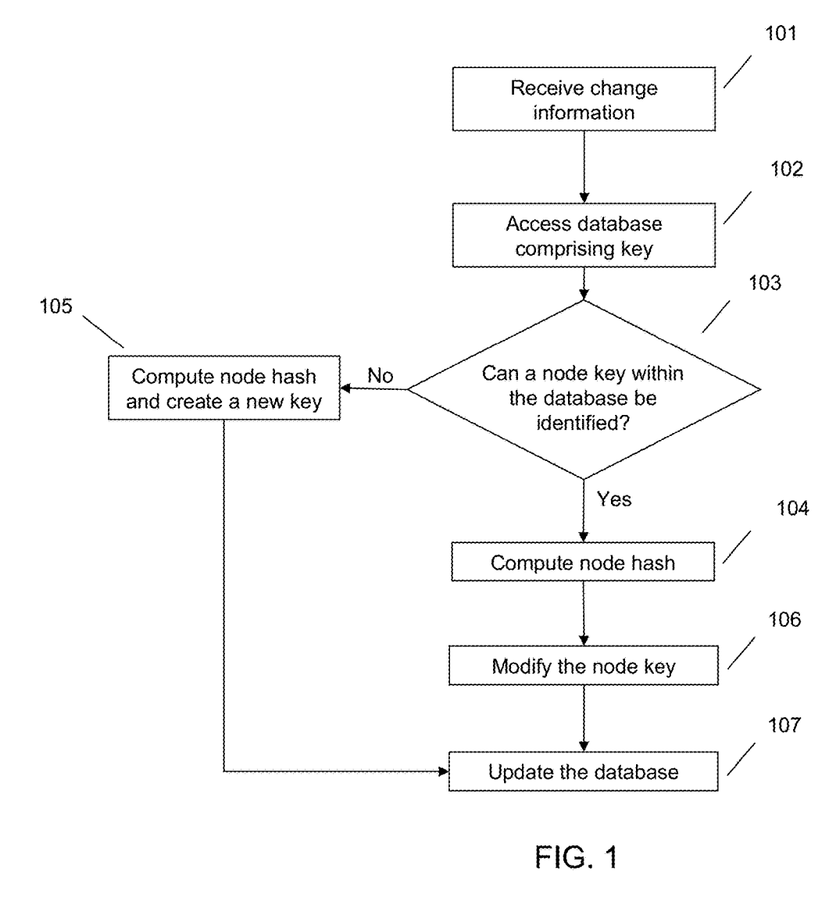
FIG. 1 illustrates a method of organizing key-value information sets into hierarchical representations for efficient signature computation given change information.

Referring now to FIG. 1, at 101 an embodiment may receive change information associated with or connected with a node within the hierarchical data structure. The change information may also include an identification of the key for the node. As an example, the change information may include the key-value assigned to the node that is being changed. Receiving the change information may include, for example, a user uploading the change information, receiving the information from a local or remote data source, and the like. For example, in the case of a shared and replicated database one entity may make a change to its database and this change information may be sent to the other entities on the network. Receiving the change information may also include an embodiment accessing a data store and pulling the information. For example, an embodiment may be instructed to access a particular data source and compare the information contained within that data source to the information currently stored in the data structure. Upon identifying a discrepancy, an embodiment may create and upload change information for the data structure.

In one embodiment the change information may be considered a change-set. Change information may include a change instruction for information stored within the data structure. The change information may also include more than one change instruction, which may affect a single node within the data structure or may affect multiple nodes within the data structure. For example, the change information may include an addition or deletion of information stored within the data structure. The change information may also include updates or modifications to the information stored within the data structure. As an example, change information may include an entity deleting a file from the data structure.

An embodiment may, at 102, access a database comprising at least one key. The key may be associated with or assigned to a particular node within the hierarchical structure. For example, the hierarchical data structure may be built using the keys. In such a structure, the addition and deletion of keys do not change the parent nodes of existing nodes. In other words, if a new key is added or deleted, the entire hierarchical structure is not reconfigured to account for the new or missing key. The key may also include a crypto-hash associated with the key's node.

The structure of the key-value may allow for a single look-up within the key database. In other words, the key identification information included in the change information may be easily matched to a key-value within the database which indicates a particular node. As an example, the keys within the hierarchical data structure may have been created so that a node can be easily identified. For example, each node key value may be dependent on the key value of a parent node. As a working example, if a key value for a particular node is identified as "cam", an embodiment can identify the parent node as "ca" and the root node as "c". Additionally, because of the structure of the keys, an embodiment can identify that the node is located on the third level of the data structure. Thus, the system can easily match the key value to a particular node by using a single look-up, rather than having to traverse the entire data structure to find the particular key value that is indicated within the change information.

In other words, by applying a transformation or external configuration to the key, an embodiment may identify information relating to the node to allow for a single look-up. In other words, using known relationships between keys in a hierarchical data structure, the key value can be manipulated to derive information regarding the location of a desired node. As an example, if the length of a key value indicates the level, an external configuration or transformation may include counting the number of characters contained within the key value. As another example, if the key value is based upon a parent value, an external configuration or transformation may include removing the last character of the key value to identify the parent node key value. Therefore, knowing the relationship of the keys within the hierarchical data structure or how the keys were configured within the hierarchical data structure may allow an embodiment to perform a transformation or apply an external configuration to the key to derive information relating to the node (e.g., node level, parent node, root node, sibling relationships, etc.). Thus, one embodiment may allow for designing a hierarchical structure by defining a transformation function such that for any given key, the function should be able to give a transformed key, the parent key of the key, and the level of the key in the hierarchy. The key may include additional information, for example, the value associated with the node, the size of the node, unique identifiers, and the like.

At 103 an embodiment may identify whether a node key (i.e., a key associated with a node) within the database can be identified. For example, an embodiment may identify if a node key exists in the database for the particular node that was changed. If a key cannot be identified (for example, a key does not exist for the node, a key is not associated with or assigned to the node, the node is a new node, and the like), an embodiment may modify the key by computing a crypto-hash, described in more detail below, and creating a new key at 105.

If, however, a key can be identified within the database, an embodiment may compute a crypto-hash at 104. A crypto-hash may be computed by applying a crypto-hash function on the content of the node and the crypto-hashes associated with children of the node. An embodiment may then modify the node based upon the computed node crypto-hash at 106. The node may include two components, the key and the value. The key represents a unique identifier for the node and the value represents the associated value of the node. The value for the node may store additional information such as the crypto-hash for the node, the crypto-hash for the children nodes, and the like. Modifying the node may include overwriting the key, appending information on the key, deleting the key, modifying the value, and the like. For ease of understanding, when describing modifying the key or a value associated with a node, the terms key-value or key may be used.

After either creating a new key-value at 105 or modifying the key-value at 106, an embodiment may update the database with the modified key-value for future use. The example has been described using a single change to a single node and therefore a change to only a single key-value. However, it should be understood that more than one change can be made to a single node, more than one node, or multiple keys within the database.

An embodiment may additionally identify a parent key within the database associated with a parent node of the changed node. A parent node is a node which has at least one dependent. Therefore, the changed node is the dependent of the parent node in this example. In identifying a parent node an embodiment may access the data structure to determine what node the changed node is a dependent of. An alternative method for identifying a parent node is by deriving the parent key from the node key, for example by transforming or applying an external configuration to the node key as explained above. In other words, in one embodiment dependent node keys may be derived from a parent node. For example, a dependent node's key may be based upon the parent node with an additional value. As an example, if a node's key value is 'bac', and this value is derived from the parent node, then the parent node may be identified as 'ba'.

The key may also be used to derive additional information regarding the changed node, for example, the length of the key may designate the level of the node in the tree. As an example, if a node's key is three characters in length, this may designate that the node is located on level three of the hierarchical data structure. Also, using the node's key, an embodiment may identify the beginning value for any children of the changed node. As an example, if the value of the changed node is 'bac', the value of any children nodes may start with 'bac'.

Upon identifying a parent node, an embodiment may effectuate the change of the changed node to the parent node. The information within the parent node may not be changed to match the information within the changed node. Rather, the parent node may be changed to indicate that a change was made to a dependent node. In other words, rather than changing the actual information contained within the node, the change to the parent node may only include identifying that a change was made to a dependent node. As an example, if information was added to the changed node, the size of the changed node may have been changed. This would also change the size of the parent node, but the parent node would only need to reflect that the size has been changed, not what actual information was modified.

Due to the fact that a child node's fingerprint has been recomputed, an embodiment may compute a fingerprint, for example a crypto-hash, for the parent node in a manner similar to computing the crypto-hash for the changed node as explained above. The key-value associated with the parent may then be modified based upon the computed parent crypto-hash. The database storing the keys may then be updated with the new parent key-value. This process may continue by moving up one level and performing the changes until the root level is reached. If the change information did not include the parent node, the change information may be updated with the parent node (for example, if the change information is going to be used for changing other data structures). In one embodiment, the parent node may store the crypto-hash information for the children nodes. In such an embodiment, only the key-value for the parent may be modified. This may reduce the need to retrieve unchanged nodes for re-computation.

In one embodiment, information may be represented as a group of buckets. This may assist in controlling the depth and width of the hierarchical structure based upon knowing exactly how many buckets nodes will exist. For example, in one embodiment a fixed number of buckets may be defined. A certain number of keys associated with information stored in the data structure may then be grouped into the bucket. The key values may then be transformed to identify the bucket that the key is now associated with. A certain number of buckets may then be grouped and a single parent may be associated with these buckets. This process may continue until the root of the node is reached.

As an example, an embodiment may have twenty-six buckets defined at the leaf level of the logical hierarchy. The keys may then all be grouped into a bucket. In this example, all keys starting with the same value will be grouped into the same bucket (e.g., keys starting with "a" are grouped into bucket 1, keys starting with "b" are grouped into bucket 2, etc.). These buckets are then grouped into buckets at the next hierarchy level. For example, two buckets at the leaf level will be grouped into a single bucket at the next level. Two buckets at the next level are then grouped into a single bucket at the next level and so on until the root node is reached. Thus, in this example, the leaf node buckets will be at the $5^{th}$ level from the root node. The $5^{th}$ level will have twenty-six buckets, the $4^{th}$ level will have thirteen buckets, the $3^{rd}$ level will have seven buckets, the $2^{nd}$ level will have four buckets, the $1^{st}$ level will have two buckets, and the root node will be single bucket at the $0^{th}$ level. Each bucket is assigned a key such that the key identifies the level of the bucket and the number of the bucket within that level. For example, the second bucket at the $4^{th}$ level may be represented by key '4_2' in the database. The value for the bucket may be the crypto-hash of its children, for example, the value of key '4_2' becomes {cryptoHashFor-5_3:2e3a . . . , cryptoHashFor-5_4:34aeb . . . }. In such an embodiment the key-value for the leaf level buckets may not be stored in the database.

As an example, assume that key 'cam' is modified. Based on the external configuration of the buckets, in this example, twenty-six buckets at leaf level and a max grouping of two buckets at each level, the parent bucket key can be identified as '5_3'. The crypto-hash for the 5_3 key can be computed by combining all the key-values for the keys starting with 'c' and executing the crypto-hash function on the combined keys. In this embodiment, the parent bucket stores the crypto-hash for its child. Thus, based upon the external configuration, the parent bucket can be identified as key 4_2. Therefore, value for the key 4_2 may then be updated, because this key stores the crypto-hash for its child (i.e., 5_3). This process then repeats for the parent bucket for key 4_2 and up through the levels until the root bucket is reached. This can be understood to be an example and the number of buckets and number of buckets grouped may be different.

Additionally, some hash function, as used in hash-map implementations, may be used to decide which bucket the key belongs to. In this embodiment, the key may be transformed as well to identify the bucket. As an example, a key 'cam' may become 'cam_5' in the database to indicate the bucket. The key-values in the database may be stored in order of bucket number of the keys. For example, keys a_5, cam_5, z_5, and the like, will follow after all the keys for bucket 4. Such a sorting may be helpful because if a key in bucket 5 changes, all the keys for bucket 5 will need to be pulled to recompute the crypto-hash for bucket 5.

Figure 2:
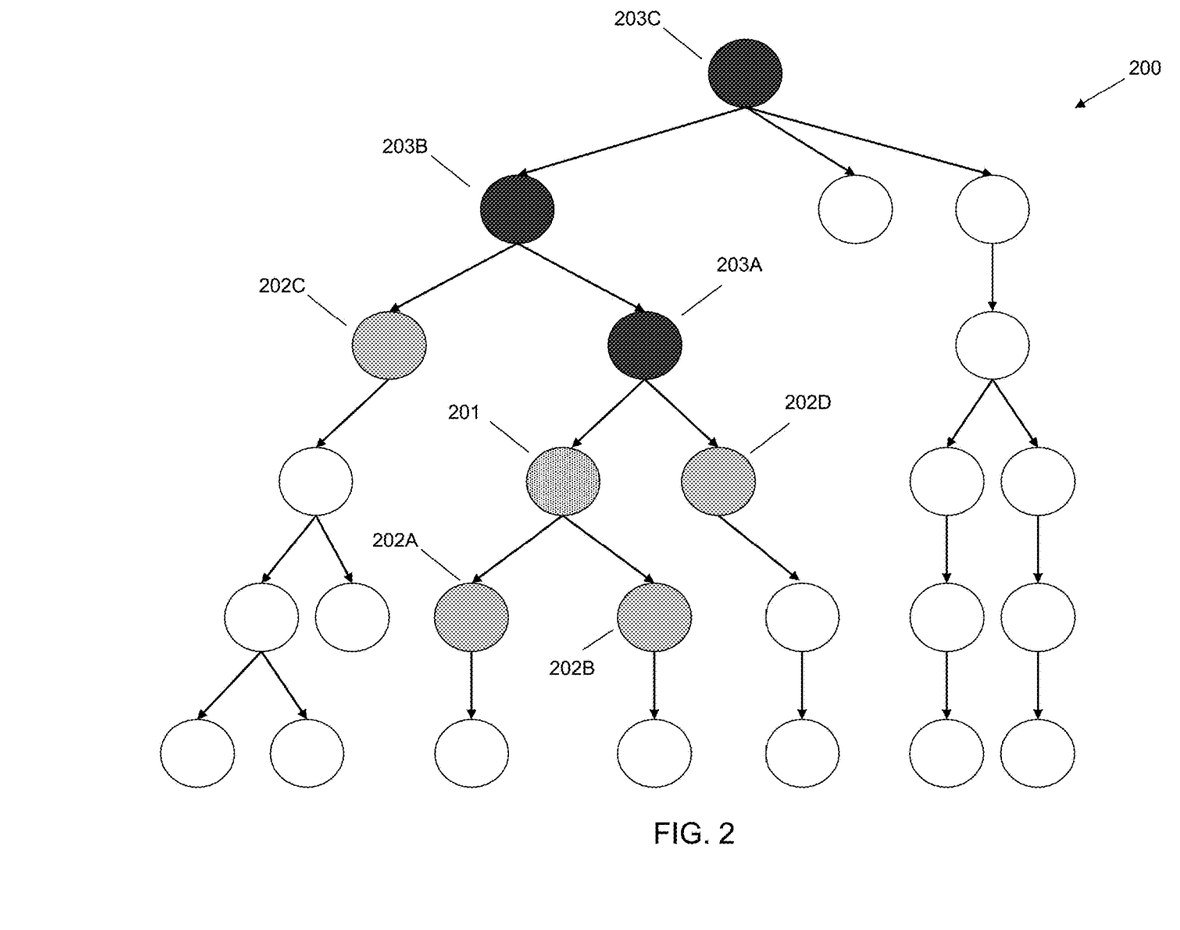
FIG. 2 schematically illustrates an exemplary hierarchical data structure.

As an example embodiment, referring to FIG. 2, which depicts an example hierarchical data structure 200, a change may be associated with a node 201. Node 201 has dependent (i.e., children) nodes 202A and 202B. Node 201 is dependent on node 203A. In other words, node 203A is the parent node of 201. Node 203A is dependent on node 203B, which is dependent on node 203C. Node 203C is also the root node. Due to the change to node 201, the crypto-hashes of nodes 203A-203C have to be recomputed. In re-computing the crypto-hash for a node, any children nodes have to be taken into account. For example, node 201 has children nodes 202A and 202B, so the crypto-hashes associated with the children nodes 202A and 202B have to be taken into account when computing the crypto-hash for 201. Likewise, when re-computing the crypto-hash for 203A, the crypto-hashes for node 201 and 202D have to be taken into account.

Figure 3:
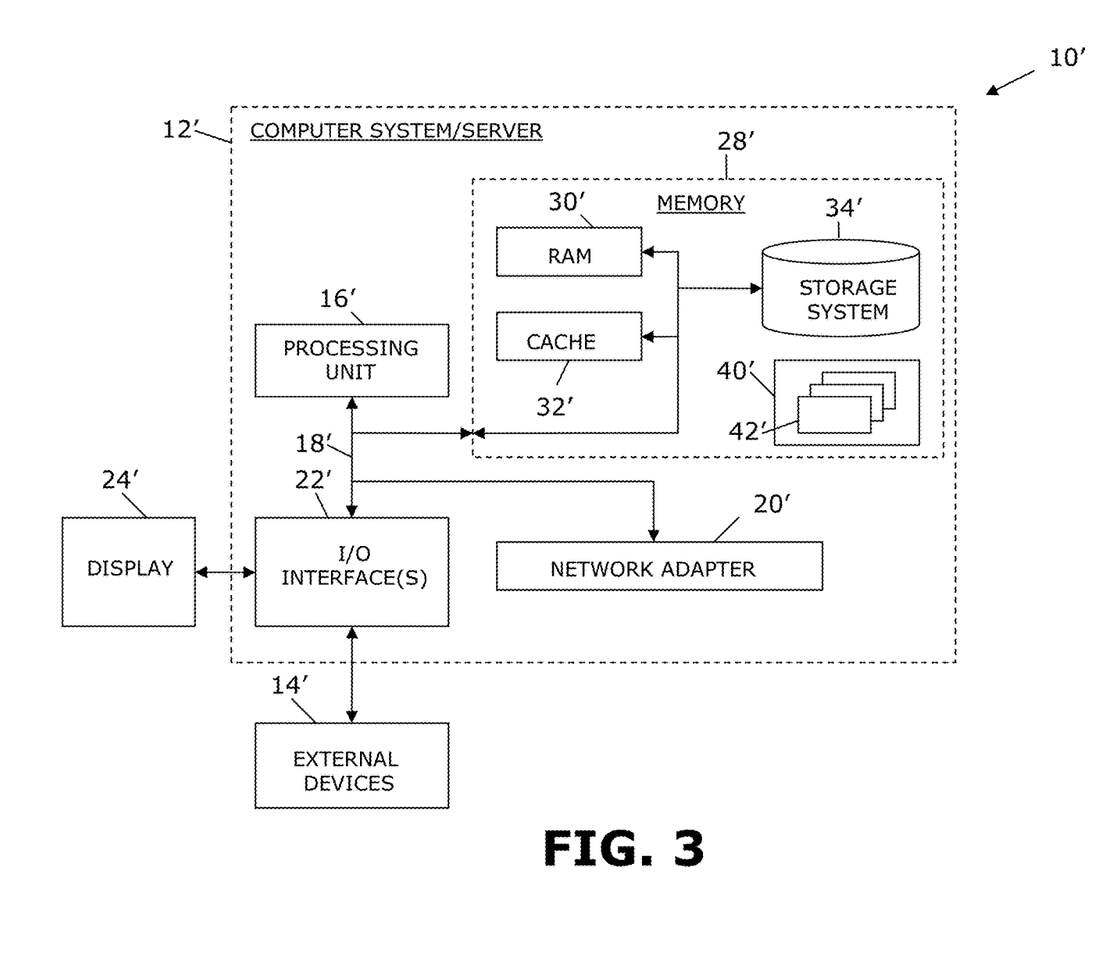
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for enabling computation of a signature of an information set given change information by storing information in a hierarchical data structure, the method comprising:

utilizing at least one processor to execute computer code that performs the steps of:

receiving change information relating to data represented by a first node within the hierarchical data structure, wherein each node within the hierarchical data structure has a corresponding assigned key and wherein the change information comprises key identification information assigned to the first node;

accessing a database associated with the hierarchical data structure and comprising at least one key, wherein the at least one key comprises a crypto-hash and is assigned to a node within the hierarchical data structure;

identifying a node key within the database that is assigned to the first node, wherein the identifying comprises (i) deriving information related to the location of the first node by applying a transformation to the key identification information and (ii) locating the node key corresponding to the first node by searching the database via a single look-up using the derived information;

computing, from the identified node key, a node crypto-hash for the first node that is based upon the first node being modified using the received change information;

effectuating the received change information within the hierarchical data structure by modifying the first node within the hierarchical data structure using the computed node crypto-hash; and updating the database with a modified node key generated based upon the effectuated change.

2. The method of claim 1, wherein the modifying comprises overwriting the identified node key.

3. The method of claim 1, wherein the identifying comprises determining that no key exists within the database and wherein the modifying comprises creating the node key.

4. The method of claim 1, comprising identifying a level within the hierarchical data structure of the first node via transforming the node key.

5. The method of claim 1, comprising identifying a parent key within the database assigned to a parent node of the first node, wherein the first node is dependent on the parent node within the hierarchical data structure.

6. The method of claim 5, wherein the identifying a parent key within the database comprises transforming the node key to derive the parent key.

7. The method of claim 5, comprising:

computing a parent crypto-hash for the parent node, the parent crypto-hash being based upon the modified first node; and modifying the parent key based upon the computed parent crypto-hash.

8. The method of claim 7, comprising adding the modified parent key to the change information.

9. The method of claim 1, wherein the identified node key comprises a node key assigned to a parent node, wherein the first node is dependent on the parent node; and wherein the node key comprises a crypto-hash for the first node and a crypto-hash for the parent node.

10. An apparatus for enabling computation of a signature of an information set given change information by storing information in a hierarchical data structure, the apparatus comprising:

at least one processor; and a computer readable storage medium having computer readable program code embodied therewith and executable by the at least one processor, the computer readable program code comprising:

computer readable program code that receives change information relating to data represented by a first node within the hierarchical data structure, wherein each node within the hierarchical data structure has a corresponding assigned key and wherein the change information comprises key identification information assigned to the first node;

computer readable program code that accesses a database associated with the hierarchical data structure and comprising at least one key, wherein the at least one key comprises a crypto-hash and is assigned to a node within the hierarchical data structure;

computer readable program code that identifies a node key within the database that is assigned to the first node, wherein the identifying comprises (i) deriving information related to the location of the first node by applying a transformation to the key identification information and (ii) locating the node key corresponding to the first node by searching the database via a single look-up using the derived information;

computer readable program code that computes, from the identified node key, a node crypto-hash for the first node that is based upon the first node being modified using the received change information;

computer readable program code that effectuates the received change information within the hierarchical data structure by modifying the first node within the hierarchical data structure using the computed node crypto-hash; and computer readable program code that updates the database with a modified node key generated based upon the effectuated change.

11. A computer program product for enabling computation of a signature of an information set given change information by storing information in a hierarchical data structure, the computer program product comprising:

a computer readable storage medium having computer readable program code embodied therewith, the computer readable program code comprising:

computer readable program code that receives change information relating to data represented by a first node within the hierarchical data structure, wherein each node within the hierarchical data structure has a corresponding assigned key and wherein the change information comprises key identification information assigned to the first node;

computer readable program code that accesses a database associated with the hierarchical data structure and comprising at least one key, wherein the at least one key comprises a crypto-hash and is assigned to a node within the hierarchical data structure;

computer readable program code that identifies a node key within the database that is assigned to the first node, wherein the identifying comprises (i) deriving information related to the location of the first node by applying a transformation to the key identification information and (ii) locating the node key corresponding to the first node by searching the database via a single look-up using the derived information;

computer readable program code that computes, from the identified node key, a node crypto-hash for the first node that is based upon the first node being modified using the received change information;

computer readable program code that effectuates the received change information within the hierarchical data structure by modifying the first node within the hierarchical data structure using the computed node crypto-hash; and computer readable program code that updates the database with a modified node key generated based upon the effectuated change.

12. The computer program product of claim 11, wherein the computer readable program code that modifies comprises overwriting the identified node key.

13. The computer program product of claim 11, wherein the computer readable program code that identifies comprises determining that no key exists within the database and wherein the computer readable program code that modifies comprises creating the node key.

14. The computer program product of claim 11, wherein the computer readable program code comprises computer readable program code that identifies a level within the hierarchical data structure of the first node via transforming the node key.

15. The computer program product of claim 11, wherein the computer readable program code comprises computer readable program code that identifies a parent key within the database assigned to a parent node of the first node, wherein the first node is dependent on the parent node within the hierarchical data structure.

16. The computer program product of claim 15, wherein the computer readable program code that identifies a parent key within the database comprises transforming the node key to derive the parent key.

17. The computer program product of claim 15, wherein the computer readable program code comprises computer readable program code that:
  computes a parent crypto-hash for the parent node, the parent crypto-hash being based upon the modified first node; and
  modifies the parent key based upon the computed parent crypto-hash.

18. The computer program product of claim 17, wherein the computer readable program code comprises computer readable program code that adds the modified parent key to the change information.

19. The computer program product of claim 11, wherein the identified node key comprises a node key assigned to a parent node, wherein the first node is dependent on the parent node; and
  wherein the node key comprises a crypto-hash for the first node and a crypto-hash for the parent node.

20. A method for enabling computation of a signature of an information set given change information by storing information in a hierarchical data structure, the method comprising:
  utilizing at least one processor to execute computer code that performs the steps of:
  receiving change information relating to data represented by a first node within the hierarchical data structure, wherein the change information comprises key identification information of the first node, wherein each node within the hierarchical data structure has a corresponding assigned key;
  updating the first node using the received change information;
  accessing a database associated with the hierarchical data structure and comprising at least one key, wherein the at least one key comprises a crypto-hash and is assigned to a node within the hierarchical data structure;
  identifying a node key within the database that is assigned to the first node, wherein the identifying comprises matching the key identification information contained within the change information to the node key, wherein the matching comprises (i) deriving information related to the location of the first node by applying a transformation to the key identification information and (ii) locating the node key corresponding to the first node by searching the database via a single look-up using the derived information;
  the node key comprising a crypto-hash for the first node;
  computing, from the identified node key, a node crypto-hash for the first node after the first node is modified using the received change information;
  effectuating the received change information within the hierarchical data structure by modifying the first node within the hierarchical data structure using the computed node crypto-hash, wherein the modifying comprises updating the crypto-hash for the first node comprised within the node key with the computed node crypto-hash;
  identifying a parent key within the database assigned to a parent node of the first node, wherein the parent key comprises a crypto-hash for the parent node;
  the first node being dependent on the parent node within the hierarchical structure;
  computing a parent crypto-hash for the parent node, wherein the computing comprises using the modified node key to compute the parent crypto-hash;
  modifying the parent key based upon the computed parent crypto-hash, wherein the modifying the parent key comprises updating the crypto-hash for the parent node comprised within the parent node key with the computed parent crypto-hash; and
  updating the database with a modified node key and the modified parent key generated based upon the effectuated change.

* * * * *